(12) United States Patent
Lim et al.

(10) Patent No.: US 11,535,535 B2
(45) Date of Patent: Dec. 27, 2022

(54) APPARATUS FOR MANUFACTURING HYDROGEN CONTAINING WATER

(71) Applicants: Guan Duk Lim, Incheon (KR); Ye Dam Kim, Incheon (KR)

(72) Inventors: Guan Duk Lim, Incheon (KR); Ye Dam Kim, Incheon (KR)

( * ) Notice: Subject to any disclaimer, the term of this patent is extended or adjusted under 35 U.S.C. 154(b) by 69 days.

(21) Appl. No.: 17/040,700

(22) PCT Filed: Mar. 22, 2019

(86) PCT No.: PCT/KR2019/003338
§ 371 (c)(1),
(2) Date: Sep. 23, 2020

(87) PCT Pub. No.: WO2019/182391
PCT Pub. Date: Sep. 26, 2019

(65) Prior Publication Data
US 2021/0009445 A1    Jan. 14, 2021

(30) Foreign Application Priority Data

Mar. 23, 2018  (KR) .................. 10-2018-0033851

(51) Int. Cl.
*C02F 1/461*        (2006.01)
*C02F 1/467*        (2006.01)
*C25B 1/04*         (2021.01)

(52) U.S. Cl.
CPC .......... *C02F 1/4618* (2013.01); *C02F 1/4676* (2013.01); *C02F 2001/4619* (2013.01);
(Continued)

(58) Field of Classification Search
CPC .................................................. A61K 33/00
See application file for complete search history.

(56) References Cited

U.S. PATENT DOCUMENTS

2013/0043124 A1*  2/2013  Park ................... A23L 2/52
                                                 204/263
2016/0032467 A1*  2/2016  Kim .................. C02F 1/46104
                                                 204/263
(Continued)

FOREIGN PATENT DOCUMENTS

CN   205222779 U  *  5/2016 ............. Y02E 60/36
CN   106361099 A     2/2017
(Continued)

OTHER PUBLICATIONS

International Search Report dated Sep. 26, 2019 in corresponding PCT Patent Application No. PCT/KR2019/003338.
(Continued)

*Primary Examiner* — Harry D Wilkins, III
(74) *Attorney, Agent, or Firm* — Grossman, Tucker, Perreault & Pfleger, PLLC

(57) ABSTRACT

An apparatus for manufacturing hydrogen containing water is disclosed. An aspect of the present disclosure may provide an apparatus for manufacturing hydrogen containing water, comprising: housing having first receiving space formed therein; cylinder coupled to the housing to form second receiving space; connecting passage penetrating the housing to interconnect the first receiving space and the second receiving space; ion exchange membrane closing the connecting passage; electrolysis part comprising an anode and a cathode, the anode being disposed in the first receiving space and the cathode being disposed in the second receiving space; exhaust pipe penetrating the housing to interconnect the first receiving space and an external space; and first waterproof membrane closing the exhaust pipe and inhibiting water from being discharged while allowing gas to be discharged.

3 Claims, 3 Drawing Sheets

(52) U.S. Cl.
CPC ............... *C02F 2001/46152* (2013.01); *C02F 2201/46115* (2013.01); *C25B 1/04* (2013.01)

(56) References Cited

U.S. PATENT DOCUMENTS

| | | | | |
|---|---|---|---|---|
| 2017/0129790 A1* | 5/2017 | Xiao | ........................ | C02F 1/444 |
| 2018/0009682 A1* | 1/2018 | Zhang | ........................ | C02F 1/48 |

FOREIGN PATENT DOCUMENTS

| | | | | |
|---|---|---|---|---|
| CN | 107319877 A | * | 11/2017 | .......... C02F 1/46104 |
| JP | 2016190232 | | 11/2016 | |
| KR | 10-1604804 | | 6/2012 | |
| KR | 10-1579044 | | 12/2015 | |
| KR | 10-1643129 | | 7/2016 | |
| KR | 10-2016-0117990 | | 10/2016 | |
| KR | 10-1748791 | | 6/2017 | |
| KR | 101747913 B1 | | 6/2017 | |
| KR | 101748791 | | 6/2017 | |
| KR | 101748791 B1 | | 6/2017 | |
| KR | 10-1805760 B1 | * | 12/2017 | .......... C02F 1/46104 |
| WO | 2017081893 A1 | | 5/2017 | |

OTHER PUBLICATIONS

Written Opinion dated Sep. 26, 2019 in corresponding PCT Patent Application No. PCT/KR2019/003338.
Japanese Office Action from related Japanese Appln. No. JP 2021-500772, dated Oct. 19, 2021. English translation attached.
Extended European Search, dated Nov. 18, 2021, Application No. 19770679.9.
Chinese Office Action, dated Mar. 2, 2022, Application No. 201980021600.7, English translation attached.

* cited by examiner

APPARATUS FOR MANUFACTURING HYDROGEN CONTAINING WATER

CROSS REFERENCE TO RELATED APPLICATIONS

This application is a § 371 of an International Application No. PCT/KR2019/003338 filed Mar. 22, 2019, which claims the benefit to Korean Patent Application Serial No. 10-2018-0033851 filed Mar. 23, 2018, both of which are fully incorporated herein by reference.

TECHNICAL FIELD

The present disclosure generally relates to an apparatus for manufacturing hydrogen containing water.

BACKGROUND INFORMATION

Conditions of human body are known to possibly have a close relation with drinking water.

Firstly, as human body controls intracellular osmosis by balancing metal ions, significant amounts of minerals, such as calcium, potassium and magnesium, may be supplied to the human body through the drinking water.

Secondly, as the human body is mostly acidic, drinking mildly alkaline water is preferable for neutralizing the acidity. In addition to the neutralizing effect, drinking mildly alkaline water is known for suppressing cancerous tumor, promoting antioxidant and enzyme activities, raising decomposition and digestion capabilities and improving immunity.

Not only does hydrogen containing water demonstrate the above effects, but the international demand for hydrogen containing water is rapidly increasing because the hydrogen containing water has been found to have a radiation detoxification efficacy when internal contamination by radiation became serious global social issues after the leakage of radioactive materials at the Fukushima nuclear power plant in 2011.

Hydrogen containing water may convert free radicals in the body and have the converted free radicals internally absorbed or externally discharged. Specifically, since hydrogen can pass through cell membranes, hydrogen can be coupled with harmful free radicals in the cells, and the free radicals coupled with hydrogen can be converted to water. Accordingly, hydrogen containing water is increasingly spotlighted for its remarkable effects discovered for various diseases, such as, for example, cancer, diabetes and cerebral infarction, which may be caused by excessive free radicals in the body.

PRIOR ART

Patent Document (Document 1) Japan Patent Publication No. 2010-269246 (Dec. 2, 2010, METHOD FOR MAKING HYDROGEN-CONTAINING DRINKING WATER)

SUMMARY

Technical Problem

Embodiments of the present disclosure may provide an apparatus for manufacturing hydrogen containing water which may retain a maximum space for manufacturing the hydrogen containing water.

Technical Solution

An aspect of the present disclosure may provide an apparatus for manufacturing hydrogen containing water, including housing having first receiving space formed therein; cylinder detachably coupled to a top end of the housing to form second receiving space, the second receiving space bordering with a top surface of the housing; connecting passage vertically penetrating a top wall of the housing to interconnect the first receiving space and the second receiving space; ion exchange membrane closing the connecting passage; electrolysis part including an anode and a cathode, the anode being disposed in the first receiving space and the cathode being disposed in the second receiving space; exhaust pipe vertically penetrating a bottom wall of the housing to interconnect the first receiving space and an external space; water inlet duct vertically penetrating the top wall of the housing to interconnect the first receiving space and the second receiving space; second cap being detachably coupled to a top end of the water inlet duct; and first waterproof membrane closing the exhaust pipe and inhibiting water from being discharged while allowing gas to be discharged, wherein the top end of the water inlet duct is positioned higher than the ion exchange membrane such that gas capture space is formed in an upper portion of the water inlet duct, gas generated in the first receiving space being captured in the gas capture space, wherein the exhaust pipe extends into the water inlet duct through a bottom end of the water inlet duct to reach the gas capture space, wherein an outer diameter of the water inlet duct is identical to an inner diameter of the second cap, wherein a top end of the exhaust pipe is positioned higher than the ion exchange membrane and lower than the top end of the water inlet duct.

The apparatus for manufacturing hydrogen containing water may further include: air vent penetrating the cylinder to interconnect the second receiving space and the external space; and second waterproof membrane closing the air vent and inhibiting the water from being discharged while allowing the gas to be discharged.

Another aspect of the present disclosure may provide an apparatus for manufacturing hydrogen containing water, including: housing having first receiving space formed therein; cylinder coupled to the housing to form second receiving space; connecting passage penetrating the housing to interconnect the first receiving space and the second receiving space; ion exchange membrane closing the connecting passage; electrolysis part including an anode and a cathode, the anode being disposed in the first receiving space and the cathode being disposed in the second receiving space; air vent penetrating the cylinder to interconnect the second receiving space and an external space; and second waterproof membrane closing the air vent and inhibiting water from being discharged while allowing gas to be discharged.

The apparatus for manufacturing hydrogen containing water may further include: exhaust pipe penetrating the housing to interconnect the first receiving space and the external space; and first waterproof membrane closing the exhaust pipe and inhibiting the water from being discharged while allowing the gas to be discharged.

The apparatus for manufacturing hydrogen containing water may further include: water inlet duct penetrating the housing to interconnect the first receiving space and the second receiving space; and second cap being detachably coupled to a top end of the water inlet duct, wherein the top end of the water inlet duct may be positioned higher than the ion exchange membrane such that gas capture space, in which gas generated in the first receiving space is captured, may be formed in an upper portion of the water inlet duct.

The exhaust pipe may be extended to the gas capture space.

A top end of the exhaust pipe may be positioned higher than the ion exchange membrane and lower than a bottom surface of the second cap.

The apparatus for manufacturing hydrogen containing water may further include filter coupled to the exhaust pipe and configured to filter ozone from the gas discharged through the first waterproof membrane.

Technical Effects

According to certain embodiments of the present disclosure, structures may be minimally installed in the second receiving space, in which the hydrogen containing water is manufactured, thereby maximizing the second receiving space, which is the space for manufacturing the hydrogen containing water.

According to certain embodiments of the present disclosure, by installing the waterproof membrane at either the exhaust pipe or the air vent, the pressure in the receiving space may be kept at an appropriate level as if the waterproof membrane functions like a relief valve, and water may be either inhibited or prevented from being discharged.

According to certain embodiments of the present disclosure, by either laminating or printing an anode and a cathode on a surface of the ion exchange membrane, electrical resistance may be lowered between the anode and the cathode. As a result, the ion exchange membrane may be less likely thermally damaged, thereby not requiring water to be filled in the first receiving space and possibly not requiring an installation of a structure for filling the water.

According to certain embodiments of the present disclosure, by forming the gas capture space between the first receiving space and the second receiving space and by extending the exhaust pipe to the gas capture space through a bottom wall of the housing, a space for installation of a structure within the second receiving space may be minimized, and the housing may be free of protrusions on an external circumferential surface thereof, thereby improving the portability of the apparatus and allowing the apparatus to be used as, for example, a tumbler.

DETAILED DESCRIPTION

Figure 1:
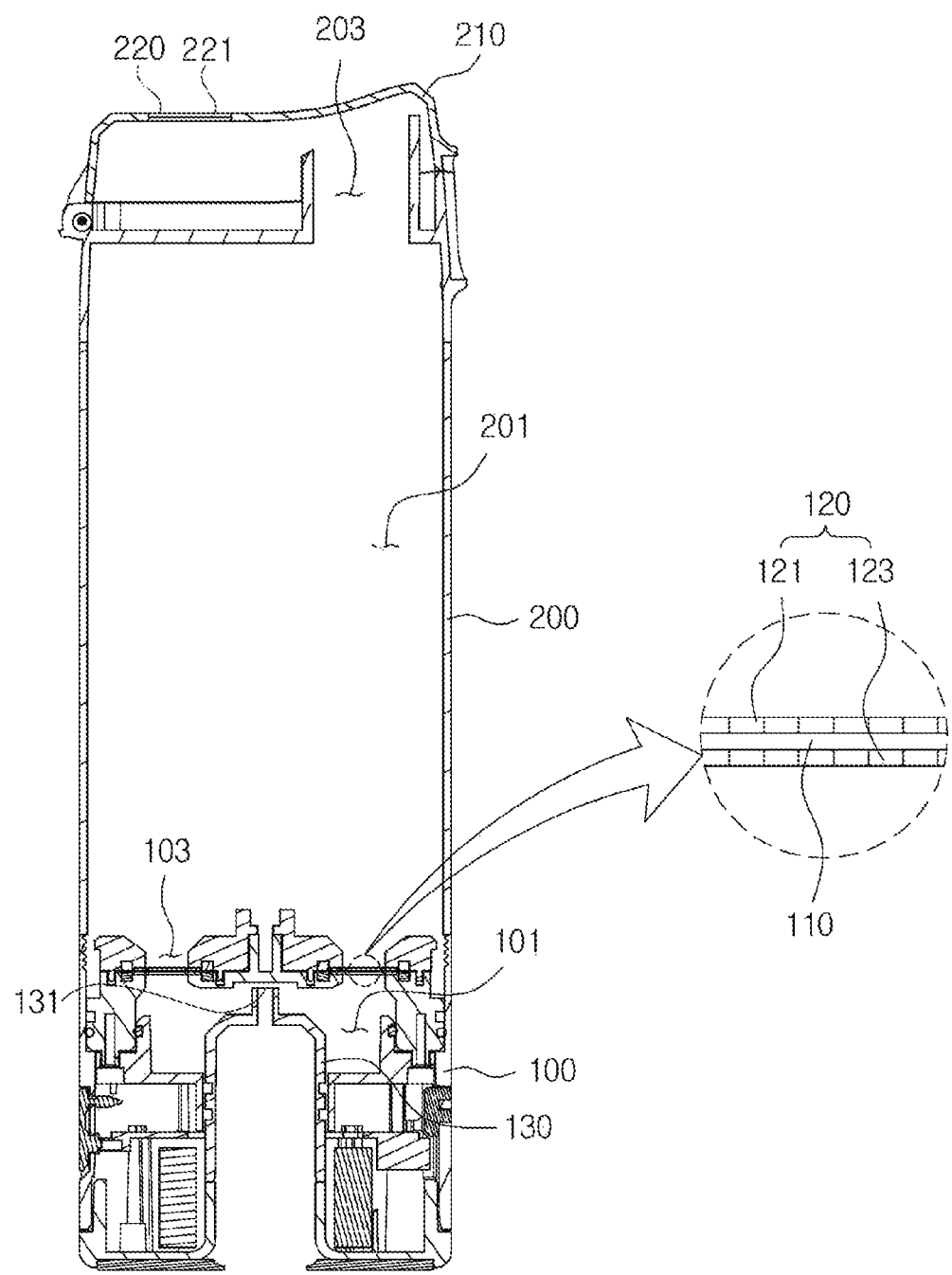
FIG. 1 is a cross-sectional view of an apparatus for manufacturing hydrogen containing water in accordance with an embodiment of the present disclosure.

The terms used herein are intended to describe certain embodiments only and shall by no means restrict the present disclosure. Unless clearly used otherwise, expressions in a singular form include a meaning of a plural form.

In the present disclosure, unless explicitly described otherwise, an expression such as "comprising" or "including" an element is intended not to preclude another or other element(s) but to designate a possibility of further comprising or including another or other element(s).

Moreover, throughout the disclosure, when something is described to be "on" an object, it shall refer to being over or under the object, not necessarily on an upper side of the object in the gravitational direction.

Moreover, when an element is described to be "coupled" with or to another element, it includes not only the case of the two elements being in physical contact with each other but also the case of a third element being interposed between the two elements and each of the two elements being in contact with the third element.

Any size or thickness shown in the drawings is provided for the purpose of illustration only, and the present disclosure shall not be bound by the illustrated size or thickness.

Terms such as "first" and "second" may be used to describe various elements, but these elements shall not be bound by these terms. These terms are only used to distinguish one element from another.

Hereinafter, some preferable embodiments of an apparatus for manufacturing hydrogen containing water in accordance with the present disclosure will be described with reference to the accompanying drawings. In describing the present disclosure with reference to the accompanying drawings, any identical or corresponding elements will be designated with the same reference numerals, and the identical or corresponding elements will not be redundantly described.

FIG. 1 is a cross-sectional view of an apparatus for manufacturing hydrogen containing water in accordance with an embodiment of the present disclosure.

Referring to FIG. 1, an apparatus 10 for manufacturing hydrogen containing water in accordance with an embodiment of the present disclosure may include housing 100, cylinder 200, ion exchange membrane 110, electrolysis part 120, exhaust pipe 130, first waterproof membrane 131, air vent 220 and second waterproof membrane 221.

Housing 110 may be formed in a hollow cylindrical shape having first receiving space 101 formed therein.

Connecting passage 103 may be formed on a top wall of the housing 100 to penetrate the top wall of the housing 100 and to interconnect first receiving space 101 and second receiving space 201. The connecting passage 103 may be formed in plurality, and the plurality of connecting passages 103 may be spaced at regular intervals about a vertically extended central axis of the housing 100. That is, an annular shape may be formed by connecting the plurality of connecting passages 103.

Cylinder 200 may be formed in a hollow cylindrical shape in which the bottom surface thereof is open and the top surface thereof is closed.

Cylinder 200 may be detachably coupled, for example, by use of screws, to a top end of the housing 100 and may form the second receiving space 201, which borders with the top surface of the housing 100.

Drinking hole 203 may be formed on a top wall of the cylinder 200 to penetrate the top wall of the cylinder 200, and the cylinder 200 may include first cap 210, which is movably coupled to the top wall of the cylinder 200 via a hinge axis to open and close the drinking hole 203.

Ion exchange membrane 110 may not allow water to pass but may allow cations, for example, hydrogen ion (H+), to pass.

The ion exchange membrane 110 may be a cation exchange membrane.

The ion exchange membrane 100 may be horizontally extended and coupled to the housing 100 to close the connecting passage 103. As a result, it is not possible for the water contained in the second receiving space 201 to move to the first receiving space 101.

Electrolysis part 120 may produce hydrogen containing water through electrolysis of the water contained in the second receiving space 201.

The electrolysis part 120 may include cathode 121 and anode 123.

The cathode 121 may be laminated or printed on one surface of the ion exchange membrane 110 to be placed on the side of the second receiving space 201 about the ion exchange membrane 110, and the anode 123 may be laminated or printed on the other surface of the ion exchange membrane 110 to be placed on the side of the first receiving space 101. The cathode 121 and the anode 123 may each form a pattern for partially exposing the ion exchange membrane 110 to provide a passage or through-hole for cations to pass.

Water may be electrolyzed at the cathode 121 to produce hydrogen gas, which may be dissolved in water to produce hydrogen containing water.

Exhaust pipe 130 may be coupled to the housing 100 to vertically penetrate a bottom wall of the housing 100 to interconnect the first receiving space 101 and an external space.

The exhaust pipe 130 may be closed by the first waterproof membrane 131.

The first waterproof membrane 131 may inhibit water from being discharged to the external space from the first receiving space 101 while allowing gas to be discharged to the external space from the first receiving space 101. As a result, the exhaust pipe 130 may provide a passage for discharging any gas that is incidentally generated while producing the hydrogen containing water.

The first waterproof membrane 131 may be manufactured as a first waterproof module by coupling the first waterproof membrane 131 to a first frame, which is in an annular shape, and the first waterproof module may be detachably coupled to the exhaust pipe 130, for example, by use of screws.

Air vent 220 may be formed to penetrate the first cap 210 in vertical directions to interconnect the second receiving space 201 and the external space. In another example, air vent 220 may be formed to penetrate a lateral wall or top wall of the cylinder 200.

The air vent 220 may be closed by second waterproof membrane 221.

The second waterproof membrane 221 may inhibit water from being discharged to the external space from the second receiving space 201 while allowing gas to be discharged to the external space from the second receiving space 201. As a result, the air vent 220 may provide a passage for discharging hydrogen gas such that the pressure of hydrogen gas in the second receiving space 201 may be maintained at an appropriate level.

The second waterproof membrane 221 may be manufactured as a second waterproof module by coupling the second waterproof membrane 221 to a second frame, which is in an annular shape, and the second waterproof module may be detachably coupled to the air vent 220, for example, by use of screws.

The first waterproof membrane 131 and the second waterproof membrane 221 may each include a membrane made of a waterproof material, for example, GORE-TEX, which inhibits water from being discharged but allows gas to be discharged.

Figure 2:
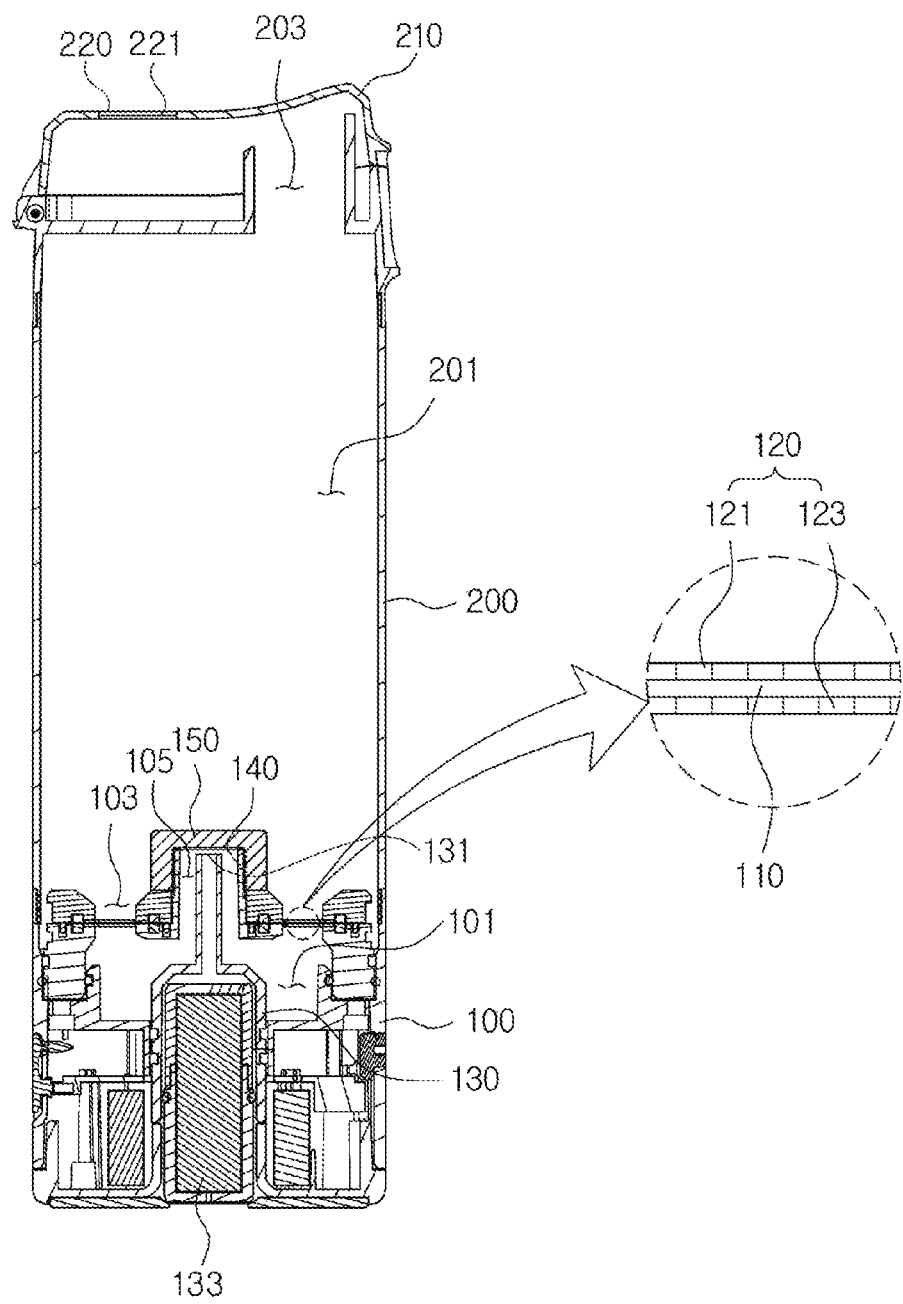
FIG. 2 is a cross-sectional view of an apparatus for manufacturing hydrogen containing water in accordance with another embodiment of the present disclosure.

FIG. 2 is a cross-sectional view of an apparatus for manufacturing hydrogen containing water in accordance with another embodiment of the present disclosure.

Referring to FIG. 2, an apparatus 20 for manufacturing hydrogen containing water in accordance with another embodiment of the present disclosure may include housing 100, cylinder 200, ion exchange membrane 110, electrolysis part 120, exhaust pipe 130, first waterproof membrane 131, air vent 220, second waterproof membrane 221, water inlet duct 140, second cap 150 and filter 133. While water may be injected into the second receiving space 201 only in the apparatus 10 for manufacturing hydrogen containing water in accordance with an embodiment of the present disclosure, water may be injected into both the first receiving space 101 and the second receiving space 201 in the apparatus 20 for manufacturing hydrogen containing water in accordance with another embodiment of the present disclosure.

Housing 110 may be formed in a hollow cylindrical shape having first receiving space 101 formed therein.

Connecting passage 103 may be formed on a top wall of the housing 100 to penetrate the top wall of the housing 100 and to interconnect first receiving space 101 and second receiving space 201. The connecting passage 103 may be formed in plurality, and the plurality of connecting passages 103 may be spaced at regular intervals about a vertically extended central axis of the housing 100. That is, an annular shape may be formed by connecting the plurality of connecting passages 103.

Cylinder 200 may be formed in a hollow cylindrical shape in which the bottom surface thereof is open and the top surface thereof is closed.

Cylinder 200 may be detachably coupled, for example, by use of screws, to a top end of the housing 100 and may form the second receiving space 201, which borders with the top surface of the housing 100.

Drinking hole 203 may be formed on a top wall of the cylinder 200 to penetrate the top wall of the cylinder 200, and the cylinder 200 may include first cap 210, which is movably coupled to the top wall of the cylinder 200 via a hinge axis to open and close the drinking hole 203.

Ion exchange membrane 110 may not allow water to pass but may allow cations, for example, hydrogen ion (H+), to pass.

The ion exchange membrane 110 may be a cation exchange membrane.

The ion exchange membrane 100 may be horizontally extended and coupled to the housing 100 to close the connecting passage 103. As a result, it is not possible for the water contained in the first receiving space 101 to move to the second receiving space 201 and for the water contained in the second receiving space 201 to move to the first receiving space 101.

Electrolysis part 120 may produce hydrogen containing water through electrolysis of the water contained in the first receiving space 101 and the water contained in the second receiving space 201.

The electrolysis part 120 may include cathode 121 and anode 123.

The cathode 121 may be laminated or printed on one surface of the ion exchange membrane 110 to be placed on the side of the second receiving space 201 about the ion exchange membrane 110, and the anode 123 may be laminated or printed on the other surface of the ion exchange membrane 110 to be placed on the side of the first receiving space 101. The cathode 121 and the anode 123 may each form a pattern for partially exposing the ion exchange membrane 110 to provide a passage or through-hole for cations to pass.

Chemical reactions at the cathode 121 and the anode 123 may be expressed, respectively, in the following chemical equations.

$$\text{Cathode: } 4H_2O+4e- \rightarrow 2H_2+4OH-$$

$$\text{Anode: } 2H_2O \rightarrow O_2+4H++4e- \qquad \text{[Chemical Equation 1]}$$

Referring to Chemical Equation 1, hydrogen ($H_2$) and hydroxyl ion (OH−) may be generated in the connecting passage 103 on the side of the second receiving space 201, and oxygen ($O_2$) may be generated in the connecting passage 103 on the side of the first receiving space 101. Some of oxygen ($O_2$) generated on the side of the first receiving space 101 may react with the water in the first receiving space 101 to be converted to ozone ($O_3$), as expressed in the following chemical equation.

$$O_2+H_2O \rightarrow O_3+2H++2e- \qquad \text{[Chemical Equation 2]}$$

Referring to Chemical Equation 1 and Chemical Equation 2, hydrogen ion (H+) may be generated in addition to oxygen ($O_2$) on the side of the first receiving space 101. The hydrogen ion (H+) may move toward the second receiving space 201 through the ion exchange membrane 110 and then may be converted to hydrogen ($H_2$) at the cathode 121. Since hydrogen ($H_2$) is highly water-soluble, the converted hydrogen ($H_2$) may be dissolved in the water contained in the second receiving space 201 to generate hydrogen containing water, and especially since hydroxyl ion (OH−) is also present in the second receiving space 201, the generated hydrogen containing water may be mildly alkaline. On the other hand, oxygen ($O_2$) is mostly in gaseous form at the room temperature and thus may increase the pressure of the first receiving space 101. Meanwhile, ozone ($O_2$) itself is unstable and thus may be mostly dissolved and decomposed in water or may be spontaneously reduced to oxygen ($O_2$). Nevertheless, since even a very small amount of ozone ($O_3$) could cause a discomforting odor or a harmful effect to humans, it is required that ozone ($O_3$) be treated properly.

Exhaust pipe 130 may be coupled to the housing 100 to vertically penetrate a bottom wall of the housing 100 to interconnect the first receiving space 101 and an external space.

The exhaust pipe 130 may be closed by the first waterproof membrane 131.

The first waterproof membrane 131 may inhibit water from being discharged to the external space from the first receiving space 101 while allowing gas to be discharged to the external space from the first receiving space 101. As a result, the exhaust pipe 130 may provide a passage for discharging any gas that is incidentally generated while producing the hydrogen containing water.

The first waterproof membrane 131 may be manufactured as a first waterproof module by coupling the first waterproof membrane 131 to a first frame, which is in an annular shape, and the first waterproof module may be detachably coupled to the exhaust pipe 130, for example, by use of screws.

Air vent 220 may be formed to penetrate the first cap 210 in vertical directions to interconnect the second receiving space 201 and the external space. In another example, air vent 220 may be formed to penetrate a lateral wall or top wall of the cylinder 200.

The air vent 220 may be closed by second waterproof membrane 221.

The second waterproof membrane 221 may inhibit water from being discharged to the external space from the second receiving space 201 while allowing gas to be discharged to the external space from the second receiving space 201. As a result, the air vent 220 may provide a passage for discharging hydrogen gas such that the pressure of hydrogen gas in the second receiving space 201 may be maintained at an appropriate level.

The second waterproof membrane 221 may be manufactured as a second waterproof module by coupling the second waterproof membrane 221 to a second frame, which is in an annular shape, and the second waterproof module may be detachably coupled to the air vent 220, for example, by use of screws.

The first waterproof membrane 131 and the second waterproof membrane 221 may each include a membrane made of a waterproof material, for example, GORE-TEX, which inhibits water from being discharged but allows gas to be discharged.

Water inlet duct 140 may be coupled to the top wall of the housing 100 to vertically penetrate the top wall of the housing 100 to interconnect the first receiving space 101 and the second receiving space 201, and second cap 150 may be detachably coupled, for example, screw-coupled, to a top end of the water inlet duct 140 to open and close an opening at the top end of the water inlet duct 140. Accordingly, a user may inject water into the first receiving space 101 through the opening of the water inlet duct 140 while the second cap 150 is separated from the water inlet duct 140.

The top end of the water inlet duct 140 is positioned higher than the ion exchange membrane 110 such that gas capture space 105, in which the gas generated in the first receiving space 101 is captured, may be formed in an upper portion of the water inlet duct 140.

The gas capture space 105 may refer to any space in the water inlet duct 140 that is positioned higher than the ion exchange membrane 110.

The exhaust pipe 130 may be extended to the gas capture space 105 to allow the gas captured in the gas capture space 105 to be discharged to the external space through the exhaust pipe 130. Specifically, a top end of the exhaust pipe 130 may be positioned higher than the ion exchange membrane 110 but lower than a bottom surface of the second cap 150, and the exhaust pipe 130 may be formed in such a way that an external diameter of an upper portion of the exhaust pipe 130 that is inserted into the water inlet duct 140 may be smaller than an internal diameter of the water inlet duct 140.

Filter 133 may be inserted into the exhaust pipe 130.

An opening at the top end of the exhaust pipe 130 may be closed by the first waterproof membrane 131, and the filter 133 may be inserted into the exhaust pipe 130 through an opening at a bottom end of the exhaust pipe 130. In other words, in order for the gas captured in the gas capture space 105 to be discharged to the external space through the exhaust pipe 130, the gas has to sequentially pass through the first waterproof membrane 131 and the filter 133. The filter 133 may filter ozone from the gas discharged through the first waterproof membrane 131 from the gas capture space 105. The filter 133 may filter ozone ($O_3$) and allow oxygen ($O_2$) to pass through from oxygen ($O_2$) and ozone ($O_3$) generated in the first receiving space 101.

Figure 3:
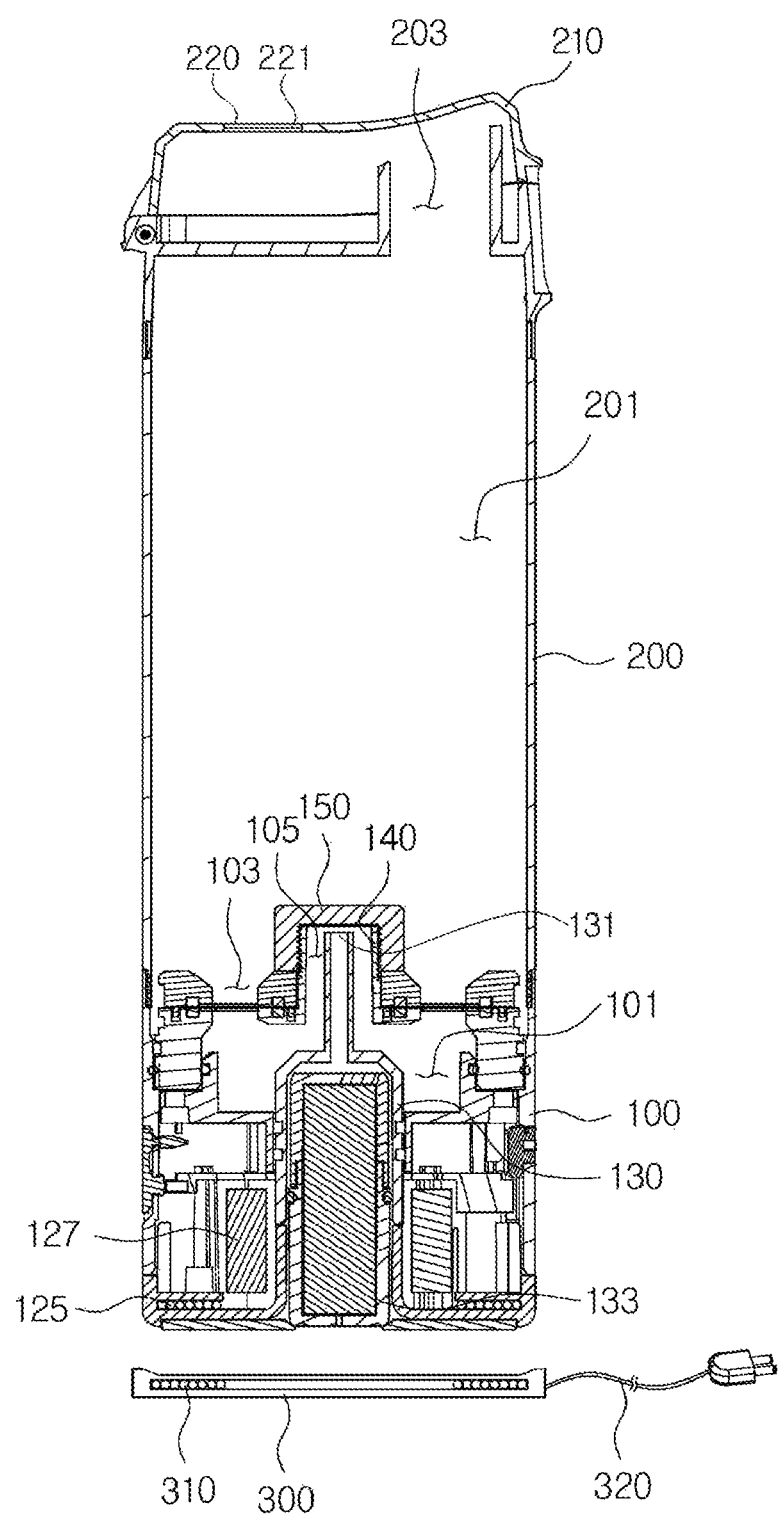
FIG. 3 is a cross-sectional view briefly illustrating how the apparatus for manufacturing hydrogen containing water shown in FIG. 2 is charged by a wireless charger.

FIG. 3 is a cross-sectional view briefly illustrating how the apparatus for manufacturing hydrogen containing water shown in FIG. 2 is charged by a wireless charger.

Referring to FIG. 3, the apparatus 20 for manufacturing hydrogen containing water in accordance with another embodiment of the present disclosure may further include wireless charger 300.

Wireless charger 300 may be provided with a flat top surface on which the housing 100 is seated and may have first induction coil 310 installed therein. The first induction coil 310 may be configured with annular-shaped multiple windings and may be electrically connected with an external power source (not shown) through wire 320, which is externally extended from the wireless charger 300. By having the intensity of a current flowing in the first induction coil 310 varied by controller (not shown), current may be induced in second induction coil 125, which constitutes the electrolysis part 120, and rechargeable battery 127, which constitutes the electrolysis part 120, may be charged by the induced current in the second induction coil 125. The rechargeable battery 127 may be electrically connected to the cathode 121 and the anode 123 through, for example, an on/off switch (not shown) formed on an external circumferential surface of the housing 100. The second induction coil 125 and the rechargeable battery (127) may be installed within the housing 125, and the second induction coil 125 may be configured with annular-shaped multiple windings, similarly to the first induction coil 310. The space within the housing 100 where the second induction coil 125 and the rechargeable battery 127 are installed may be separated from the first receiving space 101, which is another space within the housing 100.

Hitherto, certain preferred embodiments of the present disclosure have been described, but the present disclosure may be modified or permuted in various ways, without departing from the technical ideas of the present disclosure, which shall be defined by the claims appended below, by adding, changing, deleting or supplementing any element by anyone of ordinary skill in the art to which the present disclosure pertains. Nevertheless, it should be appreciated that such modifications or permutations are also included in the claims of the present disclosure.

| Description of Elements | |
| --- | --- |
| 10, 20: apparatus for manufacturing hydrogen containing water | |
| 100: housing | 101: first receiving space |
| 103: connecting passage | 105: gas capture space |
| 110: ion exchange membrane | 120: electrolysis part |
| 121: cathode | 123: anode |
| 125: second induction coil | 127: rechargeable battery |
| 130: exhaust pipe | 131: first waterproof membrane |
| 133: filter | 140: water inlet duct |
| 150: second cap | 200: cylinder |
| 201: second receiving space | 203: drinking hole |
| 210: first cap | 220: air vent |
| 221: second waterproof membrane | 300: wireless charger |
| 310: first induction coil | 320: wire |

What is claimed is:

1. An apparatus for manufacturing hydrogen containing water, the apparatus comprising:
   housing having first receiving space formed therein;
   cylinder detachably coupled to a top end of the housing to form second receiving space, the second receiving space bordering with a top surface of the housing;
   connecting passage vertically penetrating a top wall of the housing to interconnect the first receiving space and the second receiving space;
   ion exchange membrane closing the connecting passage;
   electrolysis part comprising an anode and a cathode, the anode being disposed in the first receiving space and the cathode being disposed in the second receiving space;
   exhaust pipe vertically penetrating a bottom wall of the housing to interconnect the first receiving space and an external space;
   water inlet duct vertically penetrating the top wall of the housing to interconnect the first receiving space and the second receiving space;
   second cap being detachably coupled to a top end of the water inlet duct; and
   first waterproof membrane closing the exhaust pipe and inhibiting the water from being discharged while allowing the gas to be discharged,
   wherein the top end of the water inlet duct is positioned higher than the ion exchange membrane such that gas capture space is formed in an upper portion of the water inlet duct, gas generated in the first receiving space being captured in the gas capture space,
   wherein the exhaust pipe extends into the water inlet duct through a bottom end of the water inlet duct to reach the gas capture space,
   wherein an outer diameter of the water inlet duct is identical to an inner diameter of the second cap,
   wherein a top end of the exhaust pipe is positioned higher than the ion exchange membrane and lower than the top end of the water inlet duct.

2. The apparatus of claim 1, further comprising:
   air vent penetrating the cylinder to interconnect the second receiving space and the external space; and
   second waterproof membrane closing the air vent and inhibiting the water from being discharged while allowing a gas generated in the second receiving space to be discharged.

3. The apparatus of claim 1, further comprising filter coupled to the exhaust pipe and configured to filter ozone from the gas discharged through the first waterproof membrane.

* * * * *